US008997174B1

(12) United States Patent
Wilson et al.

(10) Patent No.: US 8,997,174 B1
(45) Date of Patent: *Mar. 31, 2015

(54) CONFIGURING BROWSER POLICY SETTINGS ON CLIENT COMPUTING DEVICES

(71) Applicant: Google Inc., Mountain View, CA (US)

(72) Inventors: Glenn Wilson, Mountain View, CA (US); Sumit Gwalani, Sunnyvale, CA (US); William A. Drewry, Nashville, TN (US); Mattias Stefan Nissler, Munich (DE); Daniel Kenneth Clifford, Baldham (DE); Christopher Masone, San Francisco, CA (US)

(73) Assignee: Google Inc., Mountain View, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/688,129

(22) Filed: Nov. 28, 2012

Related U.S. Application Data

(63) Continuation of application No. 13/369,161, filed on Feb. 8, 2012, now Pat. No. 8,347,349.

(60) Provisional application No. 61/553,044, filed on Oct. 28, 2011.

(51) Int. Cl.
*G06F 12/14* (2006.01)
*G06F 11/30* (2006.01)
(Continued)

(52) U.S. Cl.
CPC ............ *H04L 63/20* (2013.01); *G06F 21/6218* (2013.01); *H04L 63/101* (2013.01); *H04L 63/08* (2013.01)
USPC ............... 726/1; 380/277; 713/176; 713/193; 726/4

(58) Field of Classification Search
CPC ... G06F 21/6218; H04L 63/08; H04L 63/101; H04L 63/20
USPC ........................................................... 726/1
See application file for complete search history.

(56) References Cited

U.S. PATENT DOCUMENTS 7,079,649 B1    7/2006    Bramhill et al.
7,298,851 B1    11/2007   Hendricks et al.
(Continued)

OTHER PUBLICATIONS

Pash, "Sync Your Firefox Extensions and Profiles Across Computers", Jun. 26, 2007, retrieved from <http://lifehacker.com/272113/sync-your-firefox-extensions-and-profiles-across-computers>.
(Continued)

*Primary Examiner* — Matthew Henning
(74) *Attorney, Agent, or Firm* — McDermott Will & Emery LLP (57) ABSTRACT

Systems and methods for configuring browser policy settings on client computing devices are provided. In some aspects, a method includes receiving login credentials from a client computing device. The client computing device includes a browser. The method also includes transmitting browser policy data associated with the login credentials to the client computing device. The browser policy data identifies browser policy settings to be installed on the browser. The browser policy settings identified by the browser policy data include four or more of: compliance settings, behavioral settings, browser/software applications, permission to access one or more websites, restrictions on accessing one or more websites, read permission in a remote document storage unit accessible via the browser, or write permission in a remote document storage unit accessible via the browser.

21 Claims, 4 Drawing Sheets

(51) Int. Cl.
*H04L 9/30* (2006.01)
*H04L 9/32* (2006.01)
*H04L 29/06* (2006.01)
*G06F 21/62* (2013.01)

(56) References Cited

U.S. PATENT DOCUMENTS

| | | | |
|---|---|---|---|
| 7,546,629 B2 | 6/2009 | Albert et al. | |
| 7,917,521 B2 | 3/2011 | Brown et al. | |
| 8,208,900 B2 * | 6/2012 | Adler et al. | 455/411 |
| 8,220,037 B2 | 7/2012 | Snyder et al. | |
| 2005/0050437 A1 | 3/2005 | Giraud et al. | |
| 2007/0271592 A1 | 11/2007 | Noda et al. | |
| 2008/0098478 A1 | 4/2008 | Vaidya et al. | |
| 2008/0140820 A1 | 6/2008 | Snyder et al. | |
| 2010/0064341 A1 | 3/2010 | Aldera | |
| 2010/0319049 A1 | 12/2010 | Dubhashi et al. | |

OTHER PUBLICATIONS

"Firefox Sync", from Wikipedia, Dec. 21, 2007, retrieved from <http://en.wikipedia.org/wiki/Firefox_Sync>.

* cited by examiner

FIG. 4

CONFIGURING BROWSER POLICY SETTINGS ON CLIENT COMPUTING DEVICES

CROSS REFERENCE TO RELATED APPLICATION

The present application claims priority from and is a continuation of previously filed U.S. application Ser. No. 13/369,161, filed Feb. 8, 2012, which claims the benefit of priority under 35 U.S.C. §119 from U.S. Provisional Patent Application Ser. No. 61/553,044, filed on Oct. 28, 2011, the disclosure of which is hereby incorporated by reference in its entirety for all purposes.

FIELD

The subject technology generally relates to client-server systems and, in particular, relates to configuring browser policy settings on client computing devices.

BACKGROUND

Oftentimes, enterprise policy settings include complex software and file sharing schemes. As a result, in order to install enterprise policy settings on a client computing device, the client computing device may need to have an operating system in the same operating system family as an enterprise server. For example, the enterprise server may run a server operating system by a first manufacturer and the client computing device may run a client operating system by the first manufacturer, where both the server operating system and the client operating system are in the first manufacturer's operating system family. An end-user of a device with an operating system manufactured by a second manufacturer, running an operating system in the second manufacturer's operating system family, may be unable to install enterprise policy settings associated with the enterprise because servers in the first operating system family may be incompatible with clients in the second operating system family.

Enterprise policy settings may include compliance settings, behavioral settings, software applications, or permissions to access data. Pushing enterprise policy settings to client computing devices may not be secure for the enterprise. Specifically, pushing enterprise policy data to client computing devices may not be secure for the enterprise because a user of the client computing device may copy the enterprise policy settings make them available on multiple different devices, where the enterprise may only intend for the policy settings to be available on one device. As the foregoing illustrates, a technique to automatically configure policy settings on client computing devices running substantially arbitrary operating systems, that is secure for both the enterprise pushing the policy settings and the client computing devices to which the policy settings are pushed, may be desirable.

SUMMARY

The disclosed subject matter relates to a computer-implemented method for installing browser policy settings on a client computing device. The client computing device includes a browser. The method includes receiving login credentials from a client computing device. The method also includes transmitting browser policy data associated with the login credentials to the client computing device. The browser policy data identifies browser policy settings to be installed on the browser. The browser policy settings identified by the browser policy data include one or more of: compliance settings, behavioral settings, browser/software applications, permission to access one or more websites, restrictions on accessing one or more websites, read permission in a remote document storage unit accessible via the browser, or write permission in a remote document storage unit accessible via the browser.

The disclosed subject matter further relates to a computer-implemented method for installing browser policy settings on a client computing device. The method includes transmitting login credentials to one or more server machines via a browser on a client computing device. The method also includes receiving, on the client computing device, browser policy data and a public key from the one or more server machines in response to the login credentials. The method also includes authenticating the browser policy data based on the public key. The method also includes automatically installing browser policy settings based on the authenticated browser policy data on the browser. The browser policy settings based on the browser policy data include one or more of: compliance settings, behavioral settings, browser/software applications, permission to access one or more websites, restrictions on accessing one or more websites, read permission in a remote document storage unit accessible via the browser, or write permission in a remote document storage unit accessible via the browser.

The disclosed subject matter further relates to a computer-readable medium. The computer-readable medium includes instructions that, when executed by a computer, cause the computer to implement a method for installing browser policy settings on the computer. The instructions include code for transmitting, via a browser on the computer, information identifying an enterprise account associated with a user of the computer to one or more server machines. The instructions also include code fore receiving, on the computer, browser policy data signed with a public key associated with the one or more server machines in response to the information identifying the enterprise account. The instructions also include code for authenticating the browser policy data based on the public key. The instructions also include code for automatically installing browser policy settings based on the authenticated browser policy data on the browser. The browser policy settings based on the browser policy data include four or more of: compliance settings, behavioral settings, browser/software applications, permission to access one or more websites, restrictions on accessing one or more websites, read permission in a remote document storage unit accessible via the browser, or write permission in a remote document storage unit accessible via the browser.

The disclosed subject matter further relates to a system. The system includes one or more processors. The system also includes a memory that includes instructions that, when executed by the one or more processors, cause the one or more processors to implement a method for installing browser policy settings on a computing device. The client computing device includes a browser. The instructions include code for receiving information identifying an enterprise account associated with a user of a client computing device. The instructions also include code for transmitting transmit, via a network, browser policy data associated with the enterprise account associated with the user of the client computing device. The browser policy data identifies browser policy settings to be installed on the browser. The browser policy data identifies browser policy settings to be installed on the browser. The browser policy settings identified by the browser policy data include one or more of: compliance settings, behavioral settings, browser/software applications, permission to access one or more websites, restrictions on accessing one or more websites, read permission in a remote document storage unit accessible via the browser, or write permission in a remote document storage unit accessible via the browser.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to configuring browser policy settings on a client computing device. The browser policy settings may include one or more of: compliance settings, behavioral settings, browser/software applications, permission to access one or more websites, restrictions on accessing one or more websites, read permission in a remote document storage unit accessible via the browser, or write permission in a remote document storage unit accessible via the browser. If the client computing device has multiple users, the browser policy settings may apply to all of the users or to a subset of the users. The client computing device may transmit, via the browser, information identifying an enterprise account, e.g., login credentials, to a server machine. The login credentials may include a user name, a password, a certificate, or an identifier of the client computing device. In response to the login credentials, the client computing device may receive browser policy data and a public key from the server machine. The client computing device may authenticate the browser policy data based on the public key. Browser policy settings based on the authenticated browser policy data may be automatically installed on the client computing device. The browser policy settings may be stored in a browser policy settings storage module on the client computing device, and may be associated with both a public key of the server machine and a signature of the client computing device, such that the source and the authenticity of the browser policy settings may be identified. Advantageously, each of the client computing device and the server machine may implement a substantially arbitrary operating system, and the operating system of the client computing device may be unrelated to or in a different operating system family than the operating system of the server machine. As used herein, an "operating system family" refers to a group of operating systems that are configured to interact and provide operating system instructions to one another, for example, in a client-server system. In one implementation, a plurality of operating systems in one operating system family may be manufactured by the same manufacturer.

Figure 1:
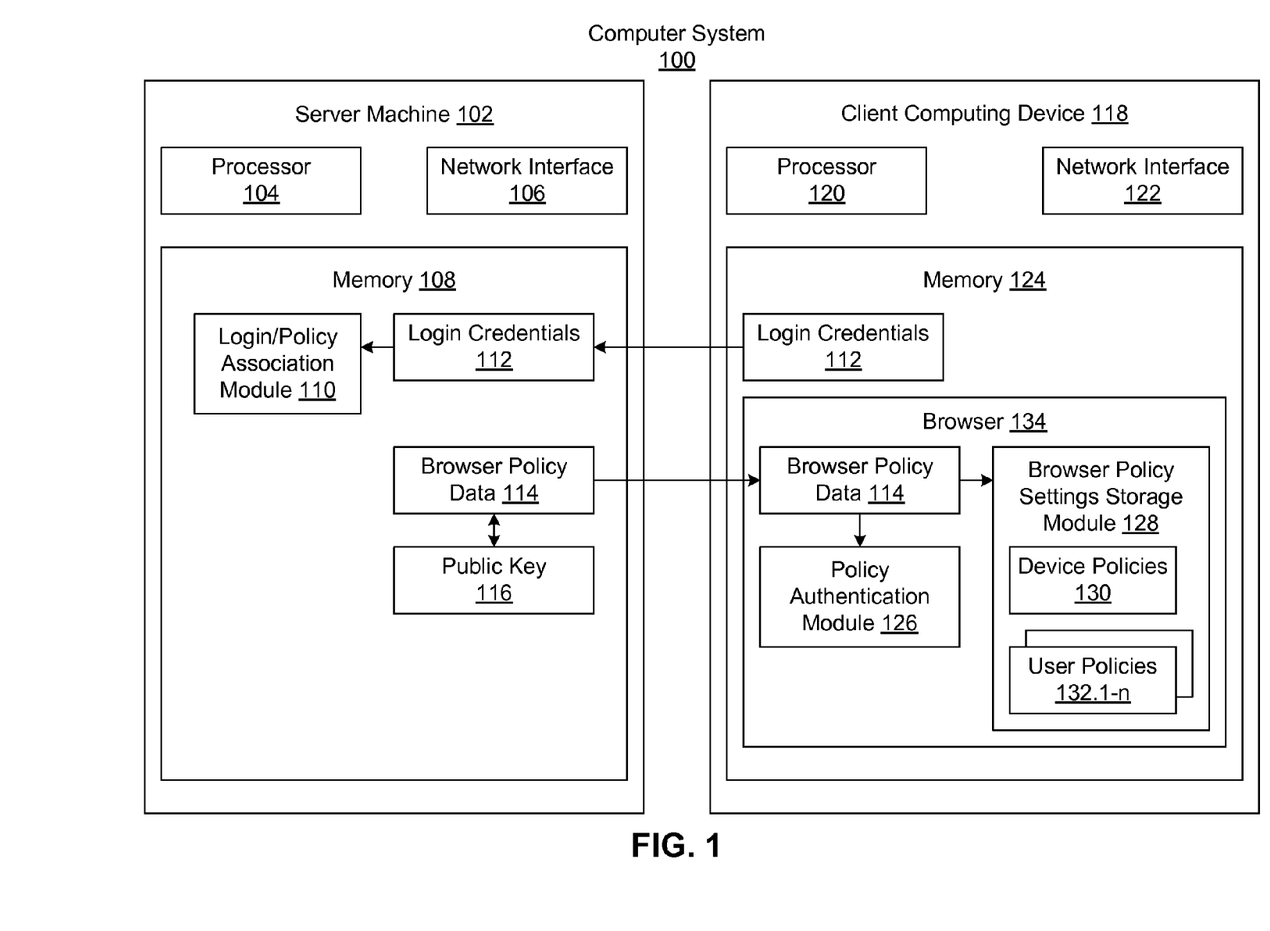
FIG. 1 illustrates an example of a computer system configured to implement configuring browser policy settings on client computing devices.

FIG. 1 illustrates an example of a computer system 100 configured to implement configuring browser policy settings on client computing devices.

As shown, the computer system 100 includes a server machine 102 and a client computing device 118. While only one server machine 102 and one client computing device 118 are illustrated, the subject technology may be implemented in conjunction with multiple server machines or multiple client computing devices.

The server machine 102 may be a single server machine, one of multiple server machines, a member of a server farm, or a member of a server cloud. As shown, the server machine 102 includes a processor 104, a network interface 106, and a memory 108. The processor 104 is configured to execute computer instructions that are stored in a computer-readable medium, such as the memory 108. For example, the processor 104 may include a central processing unit (CPU). The network interface 106 is configured to allow the server machine 102 to transmit and receive data in the network. The network interface 106 may include one or more network interface cards (NICs). The memory 108 stores data or instructions. As illustrated, the memory 108 stores a login/policy association module 110, login credentials 112, browser policy data 114, and a public key 116.

The login credentials 112 may include one or more of a user name, a password, a certificate or an identifier of a device (e.g., client computing device 118). The login credentials 112 may include cloud-based or cloud-aware login credentials, or non-cloud-based or non-cloud aware login credentials. The login credentials 112 may be verified in the cloud. In one implementation, any information identifying an enterprise account associated with the device or a user of the device may be used in place of the login credentials 112.

The login/policy association module 110 may be configured to receive login credentials 112 and verify that the login credentials 112 are valid. If the login credentials are valid, the login/policy association module may generate or provide browser policy data 114 associated with the login credentials 112. The browser policy data 114 may be transmitted to the device associated with the login credentials 112. In one implementation, the login credentials 112 include login credentials entered by a user when the user logs into the browser 134 of the client computing device 118.

The browser policy data 114 may include or be associated with a representation of browser policy settings to be installed on the browser 134 of the client computing device 118. The browser policy settings may include one or more of compliance settings, behavioral settings, browser/software applications, permission to access one or more websites, restrictions on accessing one or more websites, read permission in a remote document storage unit accessible via the browser, or write permission in a remote document storage unit accessible via the browser. In one aspect, the browser policy data may include four or more of the above. The browser policy data 114 may include a browser policy file or any other information representing browser policy settings.

The browser policy data 114 may be signed by or transmitted in conjunction with the public key 116. The public key 116 may identify the source of the browser policy data 114 as the server machine 102 or another trusted source. The public key 116 may be used to verify that the browser policy data 114 comes from a trusted source. The public key 116 may be configured such that only the server machine 102 or another trusted source can "sign" data with the trusted key, to identify the source of the data, but a substantially arbitrary computing device may verify the authenticity of data associated with the public key 116 based on the public key 116.

The client computing device 118 may be any computing device that includes a browser and is capable of storing browser policy settings. The client computing device 118 may be a laptop computer, a desktop computer, a mobile phone, a personal digital assistant (PDA), a tablet computer, a netbook, a physical machine or a virtual machine. Other devices could also implement the functionalities of the client computing device 118. The client computing device 118 may be a dedicated enterprise device associated with an enterprise associated with the server machine 102. Alternatively, the client computing device 118 may not be an enterprise device but may run software associated with the enterprise associated with the server machine 102. The client computing device 118 may include one or more of a keyboard, a mouse, a touch screen, or a display to allow a user to interact with the client computing device 118.

As shown, the client computing device 118 includes a processor 120, a network interface 122, and a memory 124. The processor 120 is configured to execute computer instructions that are stored in a computer-readable medium, such as the memory 124. For example, the processor 120 may include a central processing unit (CPU). The network interface 122 is configured to allow the client computing device 118 to transmit and receive data in the network. The network interface 122 may include one or more network interface cards (NICs). The memory 124 stores data or instructions. In one implementation, all or a portion of the data or instructions stored in the memory 124 may be integrated with an operating system or a browser 134. As illustrated, the memory 108 stores the login credentials 112 and a browser 134.

The login credentials 112 may include one or more of a user name, a password, a certificate or an identifier of the client computing device 118. In one implementation, any information identifying an enterprise account associated with the client computing device 118 or a user of the device 118 may be used in place of the login credentials 112. The login credentials 112 or the information identifying the enterprise account may be transmitted to a server (e.g., server machine 102). In one example, the user may enter the login credentials 112 while starting up the client computing device 118. Alternatively, the user may enter the login credentials 112 while running the browser 134, for example, while accessing an enterprise web page or enterprise web email.

The browser 134 may be any browser configured to display web pages or execute browser software. The browser 134 may be installed by a manufacturer of the client computing device 118 or may be a software program installed by an end-user of the client computing device. As illustrated, the browser 134 includes the browser policy data 114, a policy authentication module 126, and a browser policy settings storage module 128.

The browser policy data 114 may include or be associated with a representation of browser policy settings to be installed on the client computing device 118. The browser policy settings may include one or more of software applications, permission to access one or more websites, restrictions on accessing one or more websites, read permission in a remote document storage unit, or write permission in a remote document storage. The browser policy data 114 may be received from a server (e.g., server machine 102) and signed with a public key associated with the server (e.g., public key 116).

The policy authentication module 126 is configured to authenticate the browser policy data 114, for example, based on a public key or a signature associated with the browser policy data. If the policy authentication module 126 successfully authenticates the browser policy data 114, policy settings in the browser policy data may be installed in the client computing device 126.

The browser policy settings storage module 128 is configured to store browser policy settings associated with the browser 134 of the client computing device 118, for example, permissions, browser/software applications, compliance settings, or behavioral settings, received via the browser policy data 114. The permissions may include positive permissions, e.g., permission to access an enterprise database, or negative permissions, e.g., restrictions on accessing certain websites. Example permissions include one or more of browser settings, permission to access one or more websites, restrictions on accessing one or more websites, read permission in a remote document storage unit accessible via the browser, or write permission in a remote document storage unit accessible via the browser. The browser policy setting storage module 128 may include device policy settings 130 or user policy settings 132.1-*n*. Device policy settings 130 may include global browser policy settings associated with all users of the browser, while each of the user policy settings 132.1-*n* may be associated with a specific user account of the client computing device or the browser.

In one implementation, the user policy settings 132.1-*n* may be different for each user. For example, the browser 134 of client computing device 118 may have two users, a husband and a wife. The user policy settings 132.1 for the husband may specify, among other things, that the husband has permission to access one or more corporate intranet web pages associated with the husband's employer, while the user policy settings 132.2 for the wife may specify that the wife lacks permission to access the one or more corporate intranet web pages associated with the husband's employer.

In one aspect, the device policy settings 130 may be associated with a first enterprise, and the user policy settings 132.1 may be associated with a second enterprise, different from the first enterprise. For example, a wife may receive a device (e.g., client computing device 118) including a browser 134 subject to the device policy settings 30 associated with a first enterprise, her employer. A husband may log into the device of the wife using his login credentials with a second enterprise, his employer. During the husband's session on the device, both the device policy settings 130, associated with the first enterprise, and the user policy settings 132.1, associated with the second enterprise, may be enforced. However, in one implementation, the first enterprise policy settings may deny the installation of the second enterprise policy settings, and, thus, the husband may be unable to install the second enterprise policy settings on the device.

The browser policy settings storage module 128 may be secured by both a public key of a server (e.g., public key 116 of server machine 102) that provided the browser policy settings and a signature of the client computing device 118. The signature of the client computing device 118 may be uniquely associated with the client computing device 118. The combination of the public key of the server and the signature of the client computing device 118 ensures that the client computing device 118 may verify that the browser policy settings stored thereon are authentic. Also, a malicious virus or attack including policy settings may be prevented because the policy settings transmitted by the attacker may lack the public key of the server. Importantly, a user of the client computing device 118 may be unable to move or copy the browser policies 130 or 132.1-n from the browser policy settings storage module 128 because the browser policy settings may be signed with a signature of the client computing device 118, which may uniquely associate the browser policy settings 130 or 132.1-n with the client computing device.

In one implementation, the client computing device 118 may run a substantially arbitrary operating system and the server machine 102 may run a substantially arbitrary operating system. The operating systems of the client computing device 118 and the server machine 102 may be unrelated to one another and may be associated with different operating system families from different manufacturers. For example, the client computing device 118 may run a client operating system in a first operating system family by a first manufacturer, and the server machine 102 may run a server operating system in a second operating system family by a second manufacturer, different from the first manufacturer. The client computing device 118 may run any operating system that can be configured to implement the browser 134. The server machine 102 may run any operating system that can be configured to interact with the browser 134 and provide the browser policy data 114.

Figure 2:
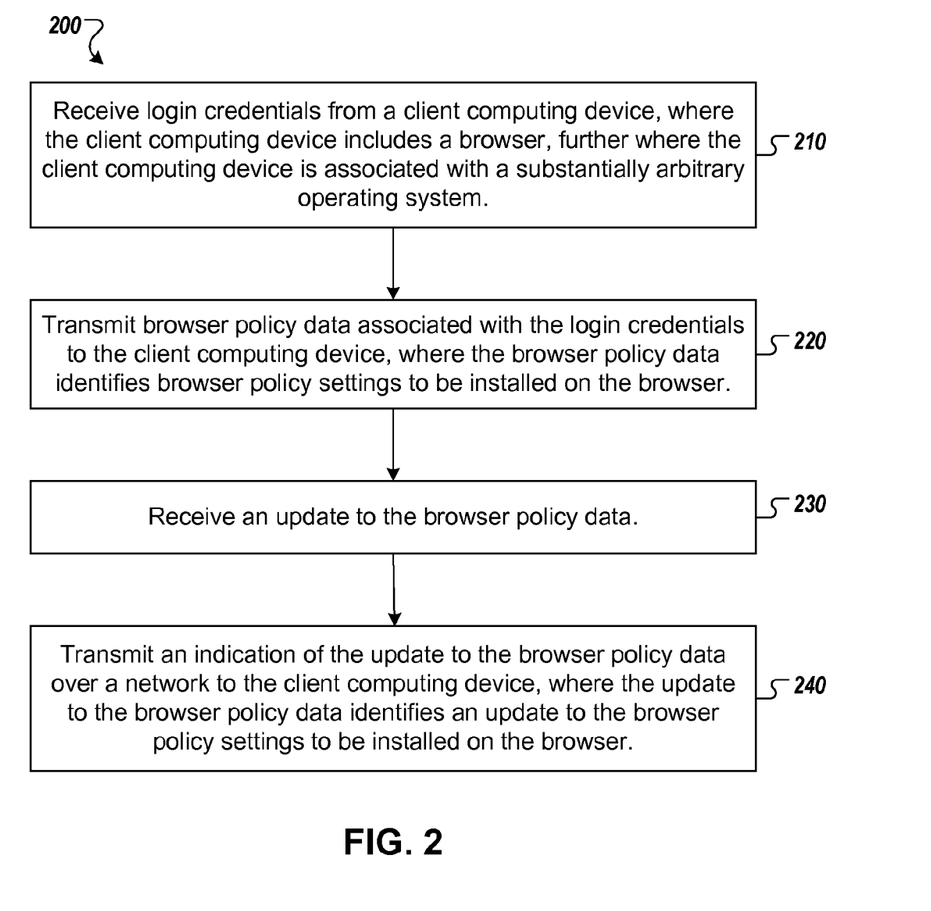
FIG. 2 illustrates an example process by which browser policy settings may be transmitted to client computing devices.

FIG. 2 illustrates an example process 200 by which browser policy settings may be transmitted to client computing devices.

The process 200 begins at step 210, where the server machine receives login credentials from a client computing device. The client computing device may include a browser and may be associated with a substantially arbitrary operating system. The login credentials may include cloud-based or cloud-aware login credentials, or non-cloud-based or non-cloud aware login credentials. The login credentials may be associated with a browser of the client computing device. The login credentials may be entered when a user starts up the browser of the client computing device. The client computing device may be an enterprise device. Alternatively, the client computing device may not be an enterprise device or may be associated with an enterprise different from an enterprise associated with the server machine. The client computing device may be associated with the login credentials of an enterprise account. In one implementation, the server machine may receive information identifying an enterprise account associated with either the client computing device or a user of the client computing device in place of the login credentials.

According to step 220, the server machine transmits browser policy data, e.g., a browser policy file, associated with the login credentials to the client computing device. The server machine may select the browser policy data based on the login credentials. The browser policy data may identify browser policy settings to be installed on the browser of the client computing device. The browser policy settings may include four or more of compliance settings, behavioral settings, browser/software applications, permission to access one or more websites, restrictions on accessing one or more websites, read permission in a remote document storage unit accessible via the browser, or write permission in a remote document storage unit accessible via the browser. The browser policy data may be transmitted over a network. The network may be a network associated with an enterprise creating the browser policy data, for example, an intranet or a virtual private network (VPN). Alternatively, the network may be a public network that is not associated with an enterprise creating the browser policy data, such as the Internet or a cellular network (e.g., a 3G network). Importantly, modifications for enterprise browser policy settings may be received on the client computing device while the client computing device is not connected to a network associated with the enterprise.

The browser policy settings associated with the browser policy data may be installed on the browser of the client computing device. The browser policy settings may include device browser policy settings for all users of the client computing device or user browser policy settings for a specific user of the browser or the client computing device. One example of device browser policy settings may be a browser update for all users of the client computing device, for example, to correct a security breach. One example of a user browser policy settings may be permission for a user to read or write data in a database accessed via the browser. It should be noted that, if the client computing device or the browser of the client computing device has multiple users, the user policy settings my be different for all users of the client computing device or the browser. For example, a first user of the client computing device or the browser may have permission to access a resource, (e.g., to read or write data in the database) while a second user may lack permission to access the resource.

According to step 230, the server machine receives an update to the browser policy data. In an enterprise setting, the update to the browser policy data may be based on updated browser policy settings created by an administrator.

According to step 240, the server machine transmits an indication of the update to the browser policy data over a network to the client computing device. The update to the browser policy data may identify an update to browser policy settings to be installed on the browser of the client computing device. In one implementation, the server machine may transmit the indication of the update to the browser policy data to multiple client computing devices. The indication of the update to the browser policy data may include an updated browser policy data, a new browser policy data, or the portion of the browser policy data to which the update applies. The network may be a network associated with an enterprise creating the browser policy data, for example, an intranet or a virtual private network (VPN). Alternatively, the network may be a public network that is not associated with an enterprise creating the browser policy data, such as the Internet or a cellular network (e.g., a 3G network). Importantly, updates for enterprise browser policy settings may be received on the client computing device while the client computing device is not connected to a network associated with the enterprise. The browser of the client computing device may update the browser policy settings stored on the browser based on the update to the browser policy data. After step 240, the process 200 ends.

Figure 3:
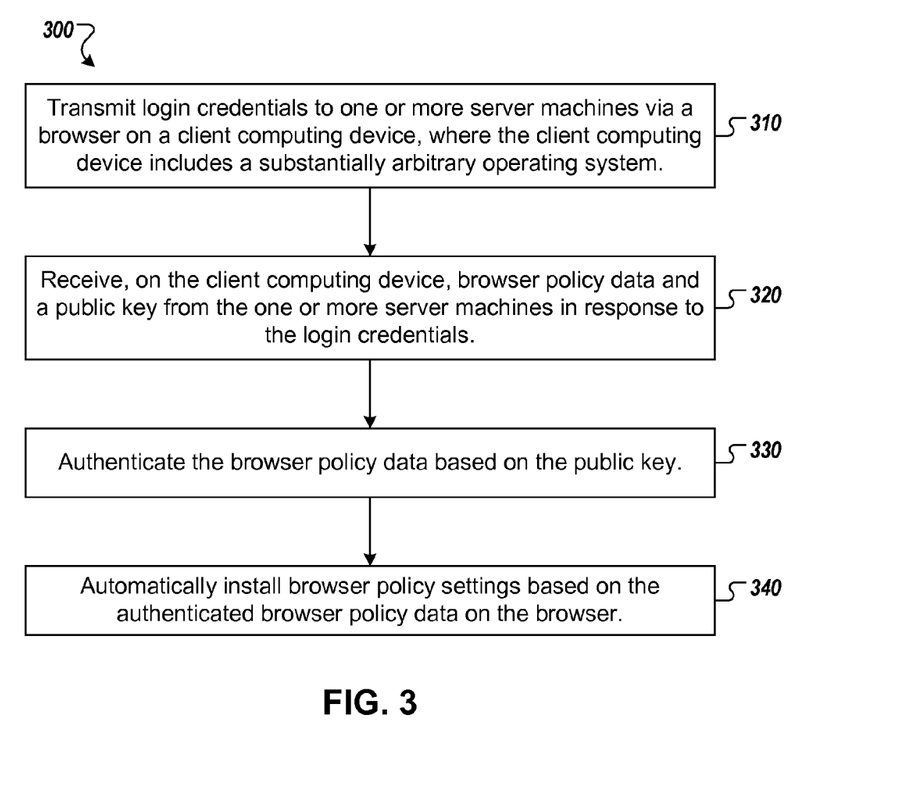
FIG. 3 illustrates an example process by which browser policy settings may be configured on a browser.

FIG. 3 illustrates an example process 300 by which browser policy settings may be configured on a browser.

The process 300 begins at step 310, where the client computing device transmits login credentials to one or more server machines. The login credentials may include cloud-based or cloud-aware login credentials, or non-cloud-based or non-cloud aware login credentials. The login credentials may be associated with a browser of the client computing device. The login credentials may be entered when a user starts up the browser of the client computing device. The client computing device may be an enterprise device. Alternatively, the client computing device may not be an enterprise device, but may be associated with the login credentials of an enterprise account. In one implementation, the client computing device may transmit information identifying an enterprise account associated with either the client computing device or a user of the client computing device in place of the login credentials. The client computing device may transmit the login credentials via the browser. The client computing device may include a substantially arbitrary operating system. Specifically, the operating system of the client computing device and the operating system of the server machine may be from different operating system families or from different manufacturers. The client computing device may implement any operating system that includes the browser.

According to step 320, the client computing device receives browser policy data and a public key associated with the one or more server machines in response to the login credentials or the information identifying the enterprise account. The browser policy data may be signed with the public key or may include the public key. The one or more server machines may include a single server machine, multiple server machines, or a server farm.

According to step 330, the client computing device authenticates the browser policy data based on the public key. The client computing device may authenticate the browser policy data in order to verify that the browser policy data is from the one or more server machines or another trusted source. As a result, browser policy settings based on browser policy data transmitted by the server machine or another trusted source may be stored on the client computing device based on the public key. However, browser policy settings based on browser policy data transmitted by an attacker may not be stored on the client computing device because the policy data transmitted by the attacker may lack the public key of the server machine.

According to step 340, the client computing device automatically installs browser policy settings based on the authenticated browser policy data on the browser. The browser policy settings may include device or global browser policy settings for one or more users of the client computing device or the browser (e.g., all the users of the client computing device or the browser). Alternatively, the browser policy settings may include user browser policy settings for a specified user of the client computing device or the browser. In one implementation, the client computing device may automatically install the browser policy settings based on the authenticated browser policy data of the client computing device by storing information based on the browser policy data in association with both a public key associated with the one or more server machines and a signature associated with the client computing device. As a result of the browser policy settings being associated with a signature associated with the client computing device, a user of the client computing device may be unable to move or copy the browser policy settings on the client computing device to another device. The information based on the browser policy data may include the browser policy data itself or information derived based on the browser policy data. As a result, the client computing device may be able to verify the source or the authenticity of the browser policy settings stored thereon. After step 340, the process 300 ends.

Figure 4:
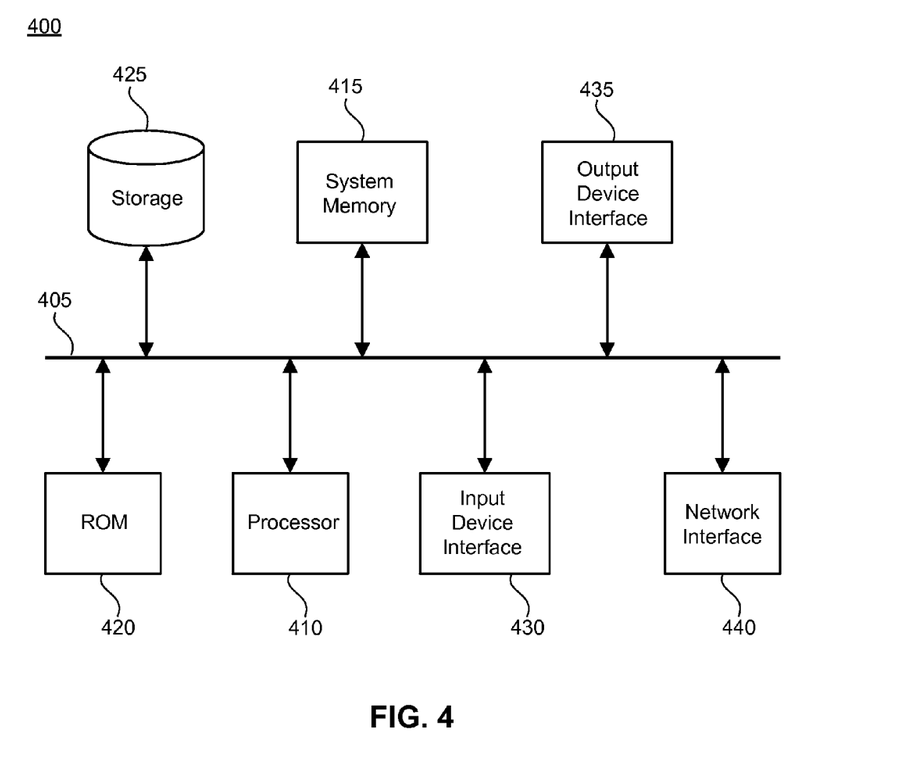
FIG. 4 conceptually illustrates an example electronic system with which some implementations of the subject technology are implemented.

FIG. 4 conceptually illustrates an electronic system 400 with which some implementations of the subject technology are implemented. For example, the server machine 102 or the client computing device 118 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data or instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for configuring browser policy settings on client computing devices in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touchscreen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A computer-implemented method for installing browser policy settings on a client computing device, the method comprising:
   receiving, at a server, login credentials from a client computing device, wherein the client computing device comprises a browser;
   transmitting, in conjunction with a public key of the server, browser policy data associated with the login credentials to the client computing device, wherein the browser policy data identifies browser policy settings to be installed on the browser, wherein the browser policy settings identified by the browser policy data comprise one or more of: compliance settings; behavioral settings, browser or software applications; permission to access one or more websites, restrictions on accessing one or more websites, read permission in a remote document storage unit accessible via the browser, or write permission in a remote document storage unit accessible via the browser, and wherein the browser policy data is transmitted for storage, on the client computing device, together with the public key of the server and a signature of the client computing device.

2. The method of claim 1, wherein the login credentials comprise one or more of: a user name, a password, a certificate, an identifier of the client computing device, or cloud-based or cloud-aware login credentials.

3. The method of claim 1, further comprising:
   receiving an update to the browser policy data; and
   transmitting an indication of the update to the browser policy data over a network to the client computing device, wherein the update to the browser policy data identifies an update to the browser policy settings to be installed on the browser.

4. The method of claim 3, wherein the network comprises an internet or a cellular network.

5. The method of claim 4, wherein the network comprises an intranet or a virtual private network (VPN).

6. The method of claim 1, wherein the client computing device is associated with an operating system configured to implement the browser.

7. A computer-implemented method for installing browser policy settings on a client computing device, the method comprising:
   transmitting login credentials to a server via a browser on a client computing device;
   receiving, on the client computing device, browser policy data and a public key from the server in response to the login credentials;
   authenticating the browser policy data based on the public key; and
   installing browser policy settings based on the authenticated browser policy data on the browser, wherein the browser policy settings based on the browser policy data comprise one or more of: compliance settings, behavioral settings, browser or software applications, permission to access one or more websites, restrictions on accessing one or more websites, read permission in a remote document storage unit accessible via the browser, or write permission in a remote document storage unit accessible via the browser, and wherein installing the browser policy settings based on the authenticated browser policy data on the browser comprises storing information based on the browser policy data together with the public key from the server and together with a signature of the client computing device.

8. The method of claim 7, wherein the browser policy settings comprise a device browser policy settings comprising global browser policy settings for one or more users of the client computing device.

9. The method of claim 7, wherein the browser policy settings comprise user browser policy settings comprising browser policy settings for a first user of the client computing device, wherein the first user has permission to access a resource according to the user browser policy settings.

10. The method of claim 9, wherein a second user of the client computing device lacks permission to access the resource according to the user browser policy settings.

11. The method of claim 7, wherein the client computing device is associated with an operating system in a first operating system family, wherein the server is associated with an operating system in a second operating system family different from the first operating system family.

12. The method of claim 7, wherein the server comprises a single server machine, multiple server machines, or a server farm.

13. A computer-readable medium comprising instructions that, when executed by a computer, cause the computer to perform a method for installing browser policy settings on a computer, the method comprising:
 transmitting, via a browser on the computer, information identifying an enterprise account associated with a user of the computer to a server;
 receiving, on the computer, browser policy data and a public key associated with the server in response to the information identifying the enterprise account;
 authenticating the browser policy data based on the public key; and
 installing browser policy settings based on the authenticated browser policy data on the browser, wherein the browser policy settings based on the browser policy data comprise one or more of: compliance settings, behavioral settings, browser or software applications, permission to access one or more websites, restrictions on accessing one or more websites, read permission in a remote document storage unit accessible via the browser, or write permission in a remote document storage unit accessible via the browser, and wherein installing the browser policy settings based on the authenticated browser policy data on the browser comprises storing information based on the browser policy data together with the public key from the server and together with a signature of the computer.

14. The computer-readable medium of claim 13, wherein the computer is associated with an operating system in a first operating system family, and wherein the server is associated with an operating system in a second operating system family different from the first operating system family.

15. The computer-readable medium of claim 13, wherein the stored information based on the browser policy data, residing on the computer, is configured to be unmovable or uncopyable by a user of the computer attempting to move or copy the stored information to a different computer.

16. The computer-readable medium of claim 13, wherein the stored information based on the browser policy data resides within a module on the computer, wherein the module is secured by both the public key from the server and the signature of the computer, and wherein the module comprises both device policy settings associated with all users of the browser and user policy settings associated with a specific user account of the browser.

17. A system for installing policy settings on a client computing device, the system comprising:
 one or more processors; and
 a memory comprising instructions that, when executed by the one or more processors, cause the one or more processors to:
  receive, at a server, information identifying an enterprise account associated with a user of the client computing device, wherein the client computing device comprises a browser, and
  transmit, via a network, in conjunction with a public key of the server, browser policy data associated with the enterprise account associated with the user of the client computing device, wherein the browser policy data identifies browser policy settings to be installed on the browser, wherein the browser policy data identifies browser policy settings to be installed on the browser, wherein the browser policy settings identified by the browser policy data comprise one or more of: compliance settings, behavioral settings, browser or software applications, permission to access one or more websites, restrictions on accessing one or more websites, read permission in a remote document storage unit accessible via the browser, or write permission in a remote document storage unit accessible via the browser, and wherein the browser policy data is transmitted for storage, on the client computing device, together with the public key of the server and a signature of the client computing device.

18. The system of claim 17, wherein the client computing device is associated with an operating system configured to implement the browser.

19. The system of claim 17, wherein the memory further comprises an operating system in a first operating system family, wherein the client computing device is associated with an operating system in a second operating system family different from the first operating system family.

20. The system of claim 17, wherein the information identifying the enterprise account is associated with a browser of the client computing device.

21. The system of claim 17, wherein the network comprises an internet or a cellular network.

* * * * *